(12) United States Patent
Webster et al.

(10) Patent No.: US 8,539,876 B2
(45) Date of Patent: Sep. 24, 2013

(54) BREW BASKET WITH INTEGRATED SEPARATE CAVITY FOR WATER BYPASS OR ADDITIVES

(75) Inventors: Joseph P. Webster, St. Charles, MO (US); Jody G. Jacobsen, St. Charles, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 235 days.

(21) Appl. No.: 12/931,131

(22) Filed: Jan. 25, 2011

(65) Prior Publication Data

US 2011/0185913 A1     Aug. 4, 2011

Related U.S. Application Data

(60) Provisional application No. 61/337,301, filed on Feb. 2, 2010.

(51) Int. Cl.
*A47J 31/02*     (2006.01)
*A47J 31/057*    (2006.01)
*A47G 19/14*     (2006.01)
*B65D 25/08*     (2006.01)
*B65D 69/00*     (2006.01)

(52) U.S. Cl.
USPC .............. 99/316; 99/323; 99/317; 99/306; 99/304; 99/307; 206/219; 206/568

(58) Field of Classification Search
USPC .............. 99/323, 316, 317, 306, 304, 307; 206/219, 568
See application file for complete search history.

(56) References Cited

U.S. PATENT DOCUMENTS

| | | | |
|---|---|---|---|
| 1,405,662 A * | 2/1922 | Biette | 99/306 |
| 3,374,897 A | 3/1968 | Martin | |
| D241,402 S | 9/1976 | Painter | |
| 4,149,454 A | 4/1979 | Kemp | |
| D256,079 S | 7/1980 | Moncrief | |
| D266,894 S | 11/1982 | Bersten | |
| D288,057 S | 2/1987 | Webster | |
| 5,746,113 A * | 5/1998 | Ko | 99/323 |
| 6,276,262 B1 * | 8/2001 | Chen | 99/322 |
| 6,279,460 B1 * | 8/2001 | Pope | 99/299 |
| 6,487,961 B2 | 12/2002 | Bunn | |
| 6,497,818 B1 | 12/2002 | Bunn | |
| 6,520,070 B1 * | 2/2003 | Heczko | 99/323.3 |
| 6,575,081 B2 * | 6/2003 | Kanba et al. | 99/299 |
| 6,786,136 B2 * | 9/2004 | Cirigliano et al. | 99/323 |

* cited by examiner

*Primary Examiner* — Joseph M Pelham
*Assistant Examiner* — Gyounghyun Bae
(74) *Attorney, Agent, or Firm* — Paul M. Denk

(57) ABSTRACT

A brew basket with an integrated separate cavity providing for a water bypass or additive conduit all of which may be added to the brewed beverage, as it exists its brew basket discharge spout during a brewing cycle. An integrated separate cavity is provided partially around the perimeter of the brew basket, as along its upper flange, for some angular distance, and which cavity tapers into a downward conduit, which conduit extends under the bottom of the brew basket, and empties into the same discharged port through which the brewed beverage is discharged from the brew basket and into a lower decanter, during performance of a brewing cycle. Additives such as flavoring, sweeteners, and even cold water may pass through the separate cavity, for intermixing with the brewed beverage, in order to add to its flavoring, sweetening, or even cooling, depending upon whether coffee, hot tea, or ice tea, has been selected for the brewing cycle. The brew basket is capable of pivoting, in its support under the cantilevered top of the brewing apparatus, to allow for the beverage to be dispensed into one or more decanters, during a brewing cycle, or during performance of sequential brewing cycles.

4 Claims, 3 Drawing Sheets

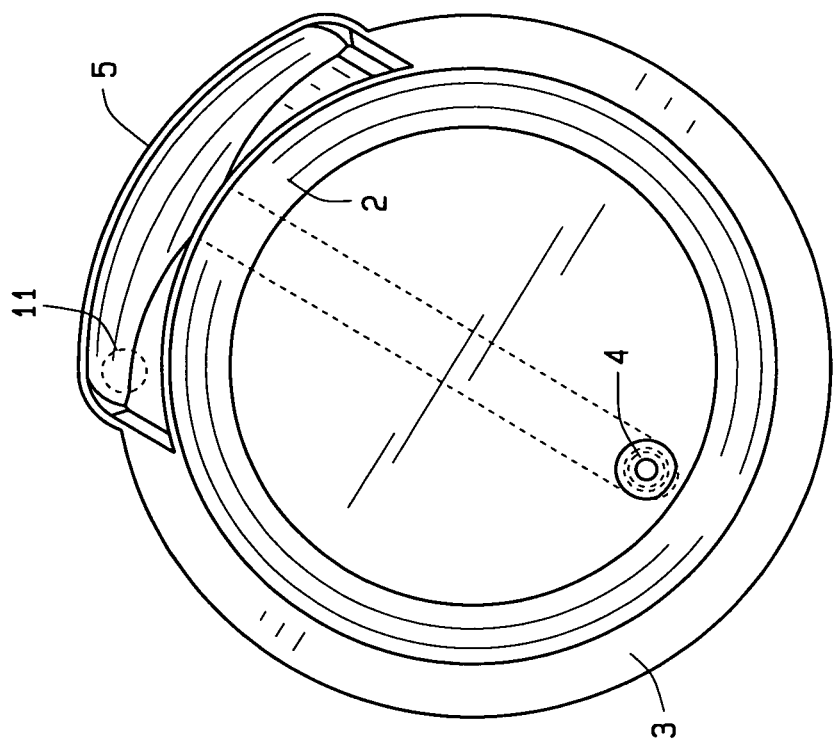
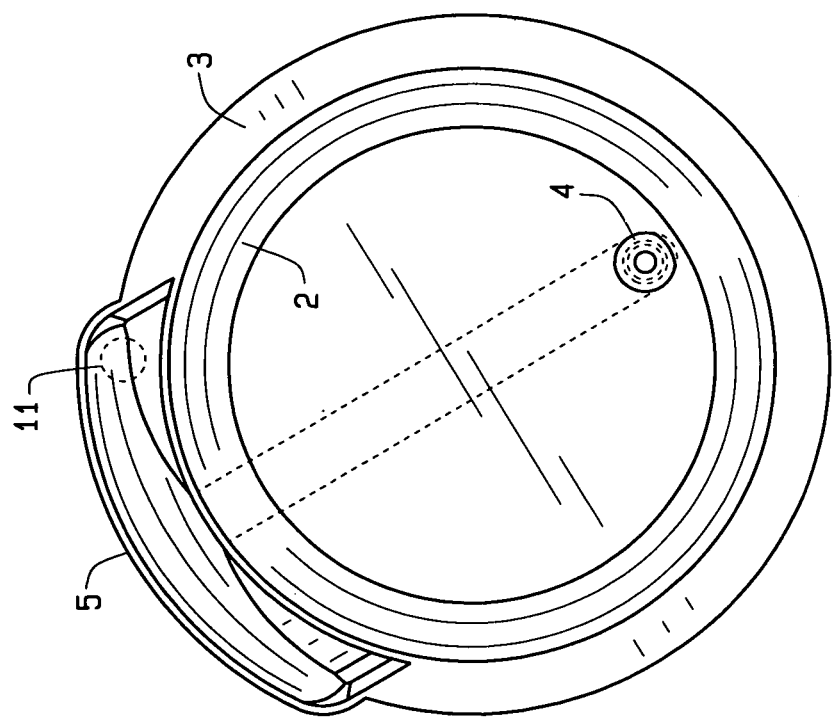

BREW BASKET WITH INTEGRATED SEPARATE CAVITY FOR WATER BYPASS OR ADDITIVES

CROSS REFERENCE TO RELATED APPLICATION

This non provisional patent application claims priority to the provisional patent application having Ser. No. 61/337,301, having filing date Feb. 2, 2010.

FIELD OF THE INVENTION

This invention relates to a brew basket for a beverage brewing apparatus, and more specifically pertains to a novel brew basket that provides different compartments or cavities for initially brewing a beverage, but also for adding sweetener, flavoring, or other beverage flavoring ingredients.

BACKGROUND OF THE INVENTION

This invention primarily relates to a brew basket. There are a variety of brew baskets that have been available in the art. The assigned Company of this current invention has a variety of patents upon various styles of brew baskets, including designs for the same. For example, see Pat. No. D 288,057.

In addition, brew baskets have long been available and used in the brewing of particularity coffee. More currently, such baskets are used for brewing of other beverages, such as tea, and after the heated water passes through the coffee or tea grounds, it is then dispensed into a beaker or decanter, as well known. Usually such a brew basket supports a filter, and the grounds are added into the filter at that capacity required to give the strength delivered for the beverage being brewed by the apparatus.

Various types of brew baskets can be seen in the earlier patents that have issued. For example, the patent to Martin, U.S. Pat. No. 3,374,897, shows a one piece funnel with integral ribs for holding a disposable coffee carrying filter. This gives an example of a brew basket, having an integrated handle, and for holding a grounds supporting filter internally thereof. Design Pat. No. D 241,402, to Painter, shows another early coffee basket. The patent to Kemp, U.S. Pat. No. 4,149,454, discloses a coffeemaker basket and filter assembly. The design Pat. No. D 256,079, to Moncrief, discloses a coffee filter holder. Another design Pat. No. D 266,894, shows a beverage filter holder. U.S. Pat. No. 6,497,818 shows a further basket. U.S. Pat. No. 6,487,961 discloses a brewing funnel.

The foregoing provides an example of prior art baskets known to the applicants, and which are used in combination with a brewing apparatus, for brewing of a beverage, particularly coffee.

SUMMARY OF THE INVENTION

This invention primarily relates to a brew basket, as previously reviewed, and more specifically defines a brew basket with an integrated separate compartment or cavity for use for bypassing a segment of water, as for example, cool water, that may be added into the brewed beverage, as it is being deposited into a beaker or decanter. Or, the invention further provides its separate cavity wherein other ingredients or additives, such as flavors, or even some liquid or powdered cream, may be manually or automatically added by the brewer into the brew basket, for mixing with the brewing beverage, as it is deposited into its collecting decanter.

In providing a summary of this particular invention, it essentially relates to the type of brew basket that normally slidingly fits under the cantilever portion of a brewing apparatus, where the hot water is heated, and then sprayed from the spray head into the brew basket, for dissolving of the grounds and for creating a fresh batch of coffee, tea, or the like. As known in the art, these types of brew baskets have an upper flange that slidingly fit under that portion of the brewing apparatus, so it can be easily slid into place, in preparation for usage, or easily slid out for removal, once a brewing cycle has been completed. Then, the basket extends downwardly, and has a perforated or ported bottom, and within the basket'is placed a filter laden with beverage grounds, and onto which the hot water is deposited, during a brewing cycle.

The concept of this current invention is to provide a supplemental compartment, that is integrated into the structure of the brew basket, normally externally thereof, or it can be structured internally of the basket, if desired. In addition, it is likely that an add on assembly forming a type of supplemental compartment could be affixed to the side of the brew basket, and function for the purposes for the current separate cavity of this invention.

The design of this invention addresses the addition of either hot or cold bypass water, used to create a desired taste profile for the brewing beverage. Equipment which brews coffee delivers the bypass water into the brew basket, but outside of or separate of the hot water that is deposited into the paper filter, which is used to hold a quantity of coffee grounds, and which filters the heated water passing through the grounds so that the grounds remain in the filter, and the freshly brewed coffee is discharged from the bottom of the filter, and into the awaiting beaker, canister, or decanter, arranged therebelow. In addition, where the brewing apparatus is for use for brewing a fresh batch of tea, and where other ingredients are desired to be added into the brewing beverage, some sweetener, such as sugar, or perhaps even some lemon flavoring, or any of the other types of flavorings that are currently used to enhance the taste of tea, can be added into the separate cavity or bypass area, as the tea is being brewed within the basket. When brewing ice tea, the hot water is delivered directly over the tea grounds, within the filter, but cold water may be added into the separate cavity, and added to the heated brewed tea liquid, to furnish dilution as the tea is delivered outside of the basket and directly into the beverage container, as a preparation of ice tea, ready for serving.

It is known that the brewing industry is moving in the direction of using equipment to brew into multiple dispensers, provided upon the same base, and the structure of this current invention is designed to accommodate that type of brewing, due to the versatility of the basket as formed, and the ease of its manipulation, during a brewing cycle. Since the bypass is fixed on the brewer and the beverage container thereunder will need to be aligned, a number of methods are needed to address this type of brewing, as it is performed.

The design of the new brew basket of this invention, and which incorporates a cavity, as in the preferred embodiment, on the outside of the basket, allows the dilution water to be collected and mixed with the concentrated brewed beverage, together under the basket, for deposit into the awaiting decanter.

The basket of this current invention, as to be noted, has its outlet positioned proximate or near the frontal portion of the formed basket. While no handle is displayed in the shown structure, it is likely that some form of handle will extend forwardly, as known, so that the basket can be easily slid into position for preparation of a brewing cycle, or to provide for the removal of the basket and its hot latent grounds, for disposal. Even without a handle, the concept of this invention is that means will be provided so the basket can be pivoted, laterally, to either side of the brewing apparatus, to deliver the brewed fluid into different containers, as desired. By creating the separate cavity for the bypass, the brewed beverage and bypass are always positioned together for ease of dispensing. The outlet can be positioned in the center of the basket, as to be noted, which promotes the mixing, or the basket can be pivoted laterally, either to a 45° angle, perhaps even up to an approximate 90° angle, so as to allow its brewed beverage to be dispensed into separate containers, since there may be as many as three located on the brewing apparatus, under the brew basket, awaiting the delivery of a beverage. By creating the separate cavity for the bypass, and the concentrate, the bypass is always positioned together with the brew basket outlet, and in this manner, it promotes a thorough mixing of the two or more ingredients, during performance of a brewing cycle.

The bypass cavity also allows for the addition of one or more flavorings, such as sweeteners, or other flavorings such as raspberry, strawberry, or other types of flavorings, to add to the appealability of the brewed ice tea, or even coffee, as the consumer desires. Also, creams may be added for coffee, or even hot tea, and other sweeteners may be added during the brewing process.

It is, therefore, the concept of this invention to provide a brew basket that has separate compartments for initially brewing a beverage, such as coffee or tea, with an integrated additional compartment into which flavorings or other condiments can be added for delivery to the brewed beverage as it is discharged into the awaiting container provided therebelow.

Another object of this invention is to provide a convenient separate cavity that can readily accept either manually, but preferably automatically from the brewing apparatus, other flavorings and ingredients that are desired to be added to the brewed beverage, as it is discharged into a decanter.

Still another object of this invention is to provide a convenient brew basket, modified for ingredient addition, which can be easily manipulated into position for brewing a beverage, or quickly removed, after a beverage cycle has been completed.

These and other objects may become more apparent to those skilled in the art upon review of the summary of the invention as provided herein, and about undertaking a study of the description of its preferred embodiment, in view of the drawings.

DESCRIPTION OF THE DRAWINGS

In referring to the drawings.

FIG. 2A is a top plan view of the brew basket, showing how the discharge dispenser of the basket has been pivoted or tilted to the side, for depositing a brewed beverage, as flavored through the use of this invention, into a decanter provided slightly laterally of the supporting base of the brewing apparatus;

FIG. 2B shows how the brew basket can be pivoted to the left, and deposit the brewed beverage into a decanter arranged to that side of the brewing apparatus during a brewing cycle.

DESCRIPTION OF THE PREFERRED EMBODIMENT

Figure 1:
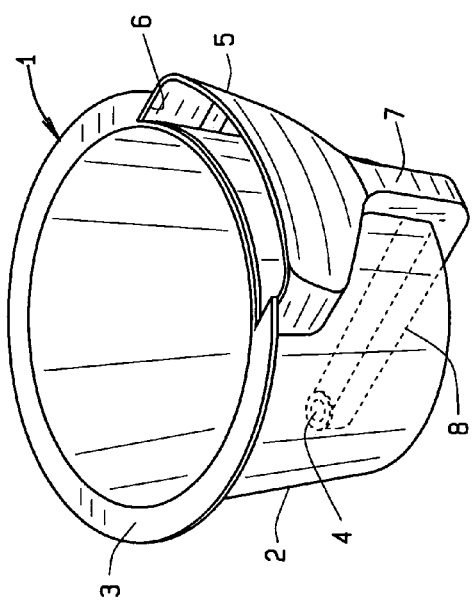
FIG. 1 is an isometric view of the brew basket of this invention.
Figure 1B:
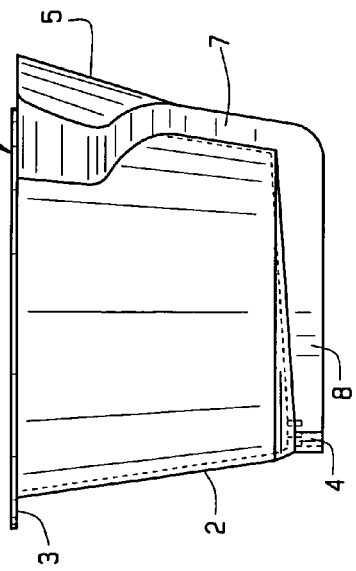
FIG. 1B provides a side view of the brew basket.

In referring to the drawings, and in particular FIG. 1, therein is shown the brew basket 1 of this invention. It includes the usual tapered side wall 2 provided entirely around its perimeter, and an integral upper flange 3 that is provided for sliding into the underside of the bracketed cantilevered portion of the brewer, that holds the basket in place, during a brew cycle. A discharged spout 4 is provided through the bottom of the basket, and which allows for the discharge of any brewed beverage, that has been processed by the beverage brewer.

The concept of this invention is to provide an add on to the brew basket, and as to be seen, a separate integrated cavity 5 is provided with an opening 6 at is upper edge, and extends approximately 15 to 40 degrees around the upper circumference of the basket. The cavity extends downwardly and is formed with a narrower conduit, as at 7, which extends under the bottom of the basket, as noted at 8, and opens into the same discharge outlet 4 for dispensing any of its additives for mixing in with the passing brewed beverage, for deposit into the decanter or beaker provided therebelow. It can be seen that the separate cavity 5, with its opening 6, is integrated in with the flange 3 of the brew basket, and extends towards its side wall 2, so it provides sufficient opening for deposit of any additives therein, as previously summarized, particularly of such additives as are automatically deposited into the cavity 5, by the operations of the beverage brewer itself. For example, if the party selecting the beverage decides they want a sweetened coffee, or tea, or cream added to their beverage, or a flavored beverage, and has depressed the proper switch to indicate their selection, then the apparatus may deposit the proper quantity of those flavorings into the cavity 5, for mixing with the brewing beverage, as it exits through the dispenser spout 4 for deposit therebelow. And, the side of the discharge spout 4 has a sufficient opening to allow for the flavoring passing through the lower conduit 8, to enter into the dispenser, and be mixed with the flowing brewed beverage, as it is deposited into a decanter.

While the concept of this invention has been described as integrating the separate cavity 5 with the brew basket 1, when molded, and that is the preferred embodiment, it may be possible that the cavity may be molded internally of the brew basket, and be structured to function in the same manner as previously described. Furthermore, it is likely that the cavity and its various assembled components, such as the lower conduit 7 and the bottom conduit 8 may be formed separately, and simply fastened or otherwise hooked onto the brew basket, to function in the same manner as described. The latter may allow the cavity to be removed, and periodically cleaned, as required.

Figure 1A:
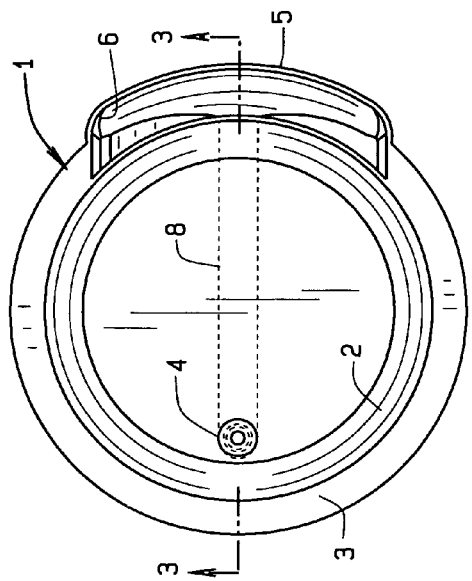
FIG. 1A provides a top plan view of the brew basket of FIG. 1.
Figure 1C:
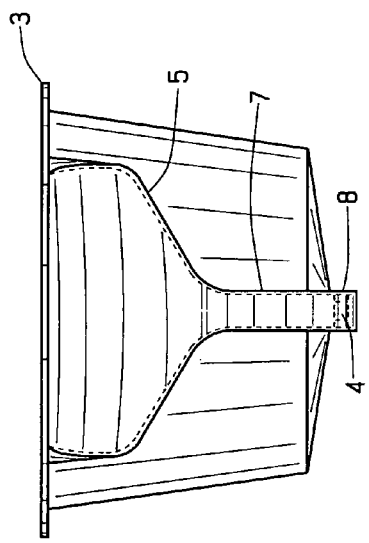
FIG. 1C provides a back end view of the brew basket showing the integrated separate cavity.

As to be seen in FIGS. 2A and 2B, it should be noted that the brew basket may be pivoted within its support under the upper cantilevered portion of the brewer, so as to locate its dispensing spout 4 to one side, as to be noted in FIG. 2A, or the brew basket may be pivoted to some degree to the left, as to be noted in FIG. 2B, and therein to allow for the brewed beverage to be dispensed into a separate decanter, during either the same or sequential brewing cycles for the apparatus. As to be seen in FIG. 1A, when the basket is arranged in that manner, it dispenses from the front of the brewing apparatus. When it has been pivoted to the right, as noted in FIG. 2A, it will dispense slightly to the right, and into a separate decanter.

Or, when it is pivoted to the left, as noted in FIG. 2B, it will dispense to even a third decanter, during its usage and application. These are examples of the versatility of the brew basket of this invention, which incorporates a flavoring additive segment that can brew the specific type of beverage desired by the customer.

Figure 3:
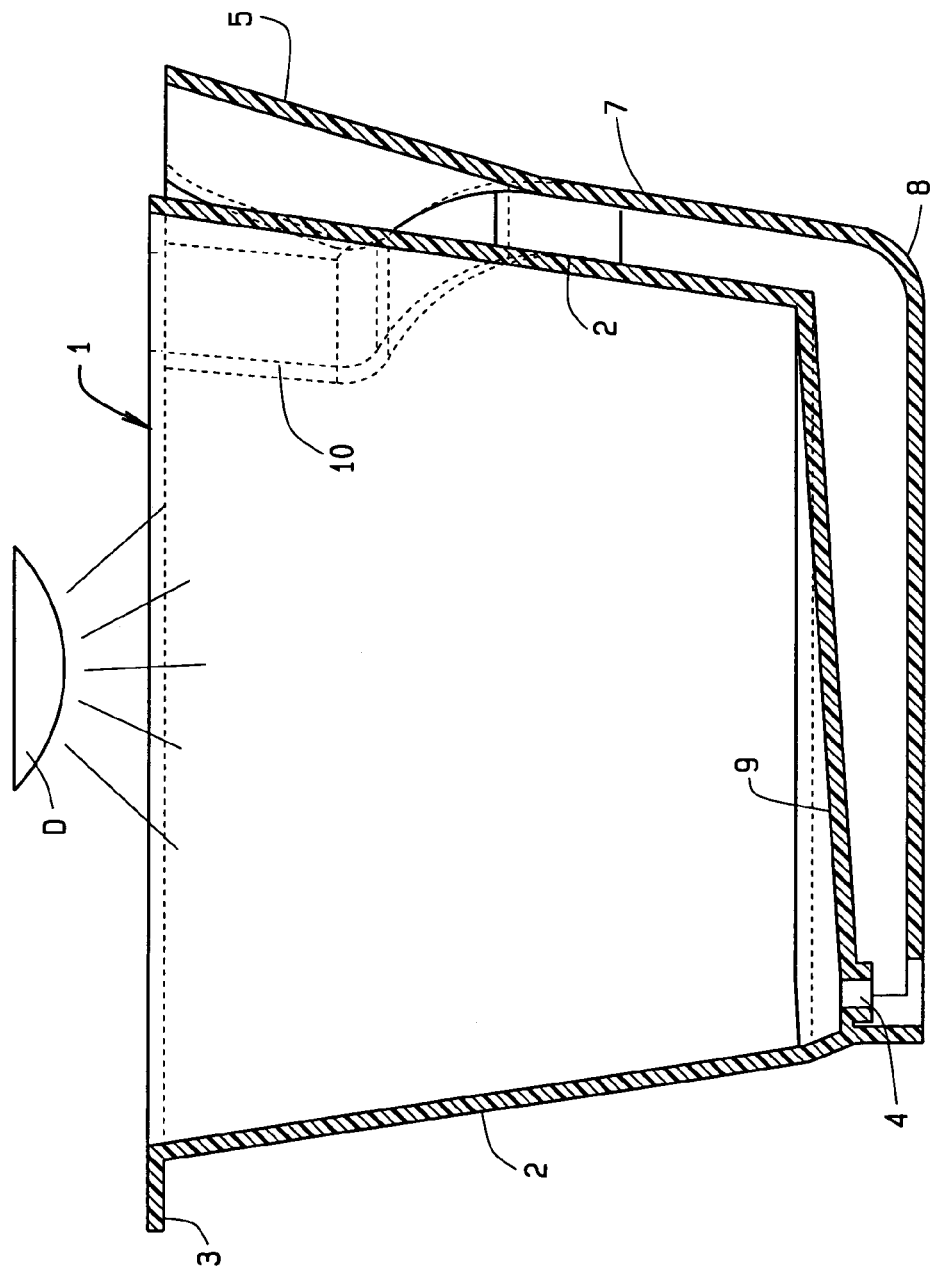
FIG. 3 provides a sectional view of the brewing basket taken along the line A-A of FIG. 1A.

As to be noted in FIG. 3, it can be seen that the bottom 9 of the brew basket forms the upper wall for the conduit 8, and the side wall 2 of the basket forms the inner wall of the lower conduit 7 for the separate cavity 5 of the integrated brew basket. And, it can be seen from the hidden lines 10 that the separate cavity extends for some distance around the circumference of the brew basket 1, in its structure. Furthermore, it can be noted that the hot water distributor D is mounted to the underside of the upper cantilevered portion "not shown" of the brewing apparatus, and which disseminates hot water into the brew basket, and onto any coffee or tea grounds that may be located upon a filter therein. As can also be seen in FIGS. 2A and 2B, the flavoring may enter into the cavity opening 6, of the basket, from a deliver spout, as noted at 11, and which is operatively affiliated with the brewing apparatus itself, for delivery of such ingredients into the cavity, and for eventual intermixing with the brewed beverage, as it is discharged from the brew basket. As to be seen, the delivery means 11 can accommodate the pivoting of the brew basket, and its discharge spout 4, to the limits of the range of pivot for the cavity 5, as to be noted.

As to be further noted in FIG. 3, the concentrate flavoring or other additive, and the brewed beverage from the basket, are intermixed together at the location of the spout 4 for distribution downwardly into any decanter. And, it may be that the brewed beverage may be discharged from the brew basket at one time, and the flavoring additive may be deposited through the cavity 5 and mixed with the passing brewed beverage, or separately deposited into the decanter, depending upon the sequence of operations of the brewing apparatus, with regard to the brewing cycle, and when such additives are to be added, either simultaneously or sequentially during the operations of a brewing cycle. And, if cold water is passed into the cavity 5, as when it is desired to brew ice tea, while hot water may be sprayed by the spray distributor D into the basket, for brewing the tea, cold water may be deposited into the cavity 5, and mixed with the brewed beverage, to cool it instantly when deposited into any decanter arranged therebelow.

Variations or modifications to the subject matter of this development may occur to those skilled in the art upon review of the invention as defined herein. Such variations, if within the spirit of this invention, are intended to be encompassed within the scope of any claims to patent protection issuing upon this development. The detail description of the invention, and its depiction in the drawings, are set fourth for illustrative purposes only.

The invention claimed is:

1. A brew basket for use with a brewing apparatus, and which is normally suspended under its upper cantilevered portion during performance of a brewing cycle, said brew basket having a sidewall, said sidewall extends entirely around its perimeter, an upper flange for use for supporting the brew basket to the brewing apparatus, a separate cavity interconnecting structurally with said basket, for some angular segment around its circumference, and said cavity extending down the side of the brew basket, and under its bottom, for communicating with the basket discharge spout, to provide for intermixing of the brewed beverage, and any additive or flavoring provided into the separate cavity, to furnish a treated brewed beverage during a brewing cycle.

2. The brew basket of claim 1 wherein said separate cavity and its conduit is integrated to the brew basket on its outer surface.

3. The brew basket of claim 1 wherein said separate cavity and conduit is integrated interiorly of the brew basket and communicates with the discharge spout of said brew basket.

4. The brew basket of claim 1 wherein said brew basket has an upper edge, and said separate cavity has an upper opening formed therein, and said cavity at its upper opening extends for approximately 80° around the circumference of the upper edge of the brew basket.

* * * * *